United States Patent
Cheng

(10) Patent No.: US 7,546,112 B2
(45) Date of Patent: Jun. 9, 2009

(54) SINGLE TELEPHONE NUMBER CALLING METHOD AND CALLING APPARATUS FOR MOBILE UNIT

(75) Inventor: Steven D. Cheng, San Diego, CA (US)

(73) Assignee: Qisda Corporation, Taoyuan County (TW)

(*) Notice: Subject to any disclaimer, the term of this patent is extended or adjusted under 35 U.S.C. 154(b) by 736 days.

(21) Appl. No.: 10/394,385

(22) Filed: Mar. 21, 2003

(65) Prior Publication Data

US 2004/0185824 A1 Sep. 23, 2004

(51) Int. Cl.
*H04M 11/04* (2006.01)
*H04W 24/00* (2009.01)

(52) U.S. Cl. .............. 455/404.2; 455/404.1; 455/456.1

(58) Field of Classification Search ............. 455/404.2, 455/428, 553.1, 432.1, 404.1, 404, 435.1, 455/456.1; 379/45
See application file for complete search history.

(56) References Cited

U.S. PATENT DOCUMENTS

| | | | |
|---|---|---|---|
| 4,893,325 A * | 1/1990 | Pankonen et al. ............. | 379/45 |
| 5,379,337 A * | 1/1995 | Castillo et al. ................ | 379/45 |
| 5,719,929 A | 2/1998 | Menard | |
| 5,732,349 A * | 3/1998 | Sanpei et al. ............. | 455/435.1 |
| 5,946,618 A * | 8/1999 | Agre et al. ................... | 455/428 |
| 6,070,065 A * | 5/2000 | Armbruster et al. ...... | 455/404.2 |
| 6,226,527 B1 * | 5/2001 | Dalsgaard et al. ......... | 455/553.1 |
| 6,240,285 B1 * | 5/2001 | Blum et al. ............... | 455/404.1 |
| 6,766,159 B2 * | 7/2004 | Lindholm ................ | 455/404.1 |
| 7,113,764 B1 * | 9/2006 | Jang et al. ................ | 455/404.1 |
| 7,251,471 B2 * | 7/2007 | Boling et al. ............ | 455/404.2 |
| 2001/0051514 A1 * | 12/2001 | Lindholm ................... | 455/404 |
| 2002/0160747 A1 | 10/2002 | Tsuchihashi | |
| 2004/0087305 A1 * | 5/2004 | Jiang et al. ............... | 455/432.1 |
| 2005/0233727 A1 * | 10/2005 | Poikselka et al. ........ | 455/404.2 |

FOREIGN PATENT DOCUMENTS

CN 1383334 12/2002

* cited by examiner

*Primary Examiner*—Thjuan K Addy

(57) ABSTRACT

The present invention provides a calling method by a mobile unit. The mobile unit pre-stores a default dialing number, and has a database storing a plurality of primary dialing numbers. Each of the primary dialing numbers corresponds to one geographic location. When a user dials a calling number, the present invention tests if the calling number is identical to the default dialing number. If the calling number is identical to the default dialing number, the present invention retrieving one primary dialing number from the database based upon a current location of the mobile unit. Then, the present invention makes a telephone connection based on the one primary dialing number.

8 Claims, 5 Drawing Sheets

SINGLE TELEPHONE NUMBER CALLING METHOD AND CALLING APPARATUS FOR MOBILE UNIT

FIELD OF INVENTION

The present invention relates to a calling method and a calling apparatus and, more particularly, to a single telephone number calling method and apparatus for a mobile unit.

BACKGROUND OF THE INVENTION

The customized telephone numbers of mobile unit are the numbers either defined by the users or the government(s). Unlike the ordinary telephone numbers, these customized telephone numbers are portable to certain degree or can be recognized in more than one routing area. The users of mobile unit can use these customized telephone numbers to make a direct call.

A scenario of the customized telephone number defined by the government is the 9-1-1 emergency number in United States and Canada. However, 1-1-9 is the emergency call number in Taiwan; 1-1-2 is the single emergency telephone number for the European Union; 0-0-0 and 1-1-2 for Australia; in Belgium, besides 1-1-2, one can dial 1-0-0 and 1-0-1. Having various emergency numbers in various countries can be problematic. For example, dialing 9-1-1 and asking emergency service in Australia or European Union (EU) will not work. Since the customized telephone numbers are not uniform throughout the world, it is a problem for users to use a consolidated single telephone number to deal with the emergency calls globally. Therefore, there is a need to have a single emergency telephone number that can be used around the world.

Regarding the customized telephone number defined by the users, each user has her/his personal reference number. The users may define a customized telephone number for a bank or library that they are familiar with. However, a bank or a library may have more than one branch in different cities. When a user is traveling in different cities, she/he should write down the telephone numbers of branches in their phone book and needs time to look for it. It is desirable to have a single customized phone number for "Bank" during traveling in different cities to connect to the local branch.

A solution to this problem was proposed by Menard et al, U.S. Pat. No. 5,719,929. However, the prior art requires apparatus at both the mobile unit and the mobile network side. If the network doesn't provide the features proposed in U.S. Pat. No. 5,719,929, the users cannot use the single calling number approach to simplify the dialing process.

SUMMARY OF THE INVENTION

The present invention refers to the mobile device using a single telephone number to reach the corresponding party everywhere. The calling method and the apparatus of the present invention allow users to make a telephone connection around different cities, even worldwide, without memorizing or searching for other associated telephone numbers.

The present invention provides a calling method by a mobile unit. The mobile unit pre-stores at least one default dialing number, and has a database storing a plurality of primary dialing numbers corresponding to the at least one default dialing number. Each of the primary dialing numbers corresponds to different geographic location. When a user dials a calling number, the present invention checks if the calling number is identical to the at least one default dialing number. If the calling number is identical to the at least one default dialing number, the present invention retrieves one primary dialing number from the database based upon a current location of the mobile unit. Then, the present invention makes a telephone connection using the primary dialing number.

Further, the present invention also provides a calling apparatus for a mobile unit. The mobile unit pre-stores at least one default dialing number. The mobile unit has a database, a test unit, a deriving unit and a connection unit. The database stores a plurality of primary dialing numbers corresponding to the at least one default dialing number. Each of the primary dialing numbers corresponds to different geographic location. The test unit checks if an input calling number dialed by the user is identical to the at least one default dialing number. The deriving unit derives one dialing number from the database based upon a current location of the mobile unit. The connection unit makes a telephone connection based upon the dialing number obtained from the deriving unit.

DETAILED DESCRIPTION

The present invention provides a calling method and a calling apparatus for a mobile unit. The mobile unit pre-stores a default dialing number defined by a user. For example, a user may define "9-1-1" as a customized number for the emergency service around the globe. Even when the user comes to Taiwan where the emergency number is 1-1-9, he/she still can dial the 9-1-1 for emergency assistance. Furthermore, if the users don't define a default dialing number for emergency service, the emergency number used in the users' Home Public Line Mobile Network (HPLMN) will be used as the default number for the emergency service.

The mobile unit has a first database storing a plurality of primary dialing numbers corresponding to the customized number, i.e., the emergency number, each of the primary dialing numbers corresponding to different geographic location. For instance, a user may pre-load a worldwide emergency number database with the country code/country name into a nonvolatile memory within the mobile unit. For another example, a user may find out the local library information of different cities from the Internet, and download them into the nonvolatile memory within the mobile unit to build their own local library phone numbers database.

Figure 1A:
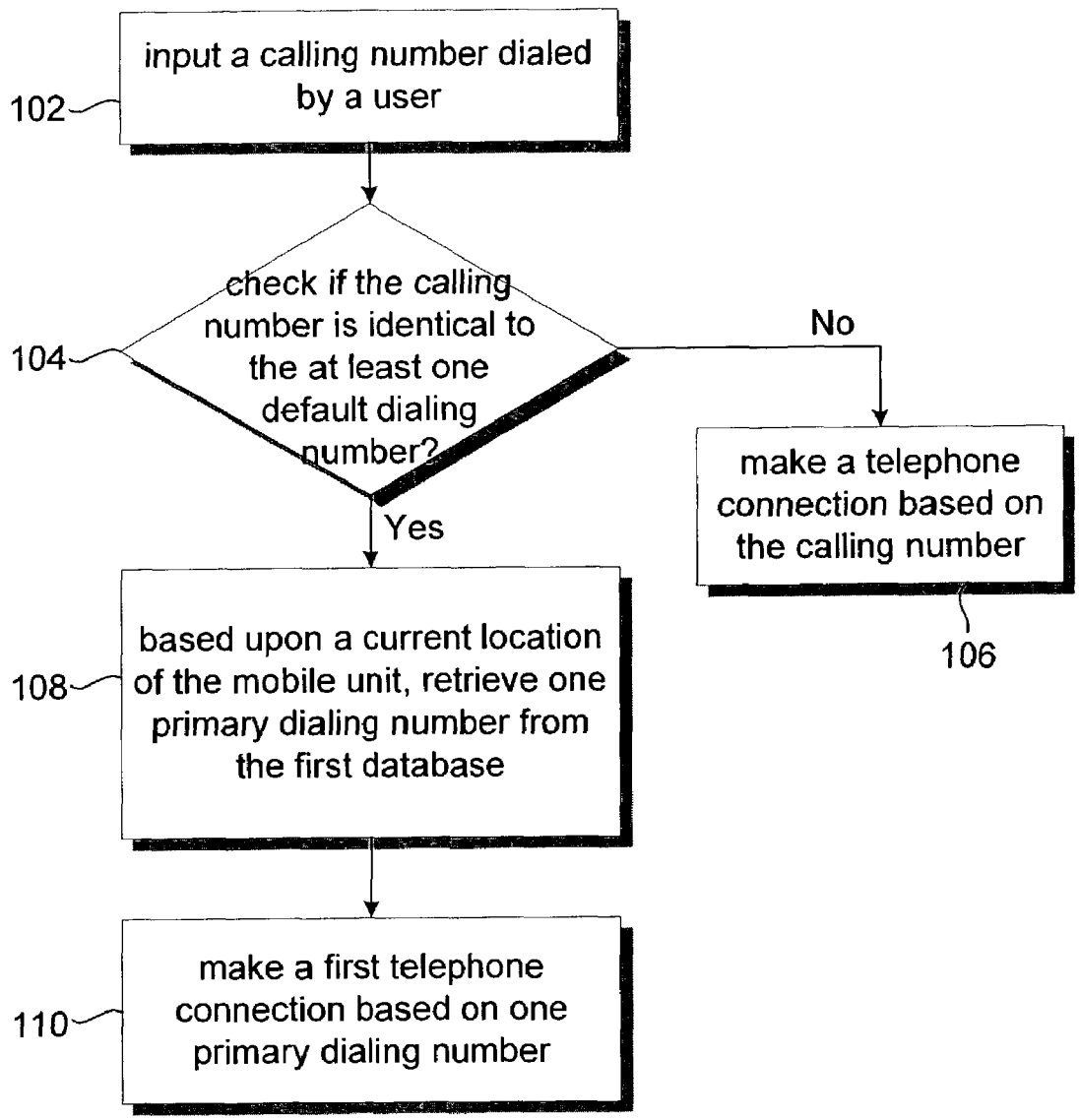
FIG. 1(a) and 1(b) both show the flowchart of the present invention.
Figure 1B:
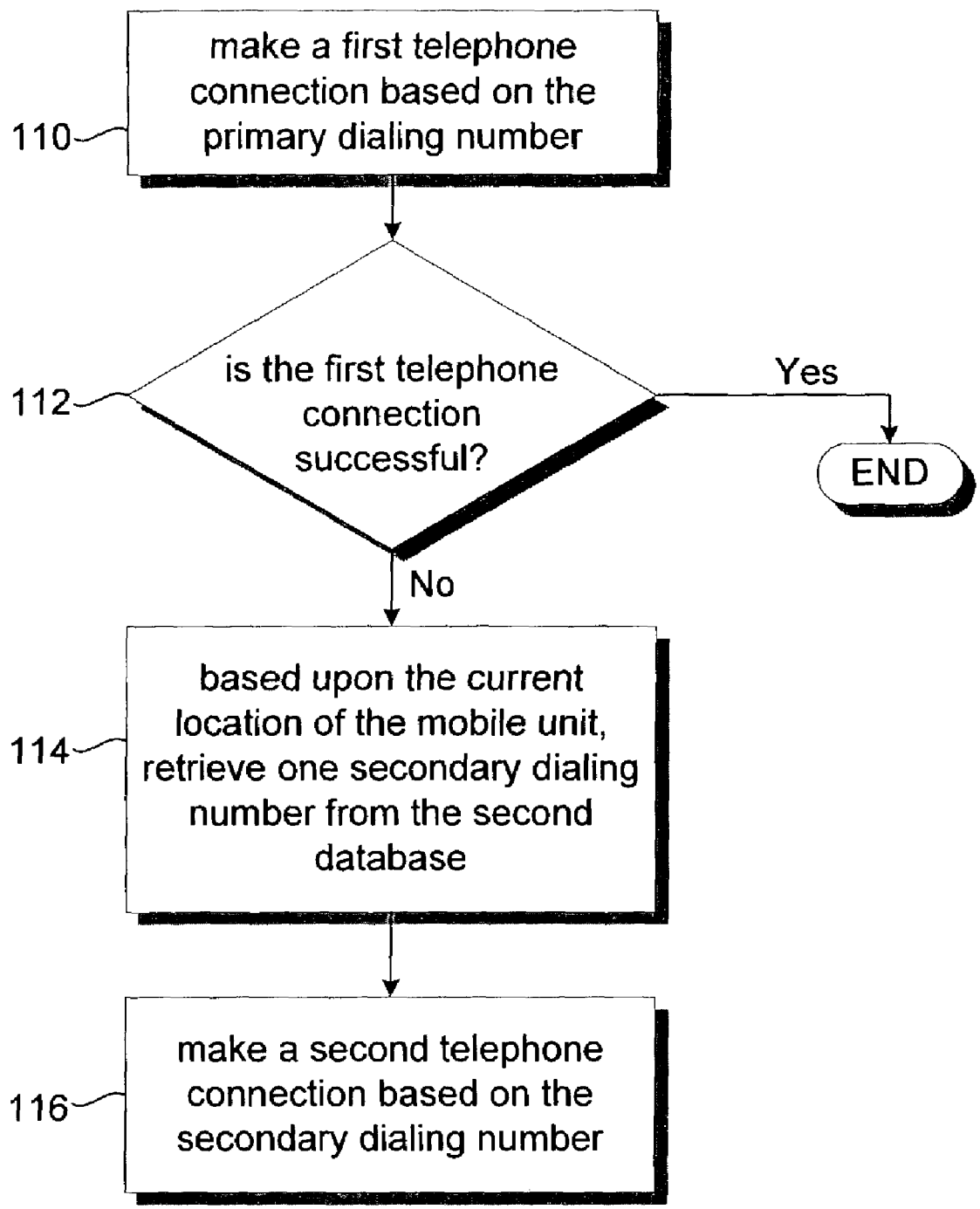

FIG. 1(a) and 1(b) both show the flowchart of the present invention. In FIG. 1(a), when a user inputs a calling number into a mobile unit in step 102, the mobile unit checks if the calling number is identical to the at least one default dialing number. If it is not identical to the at least one default dialing number, the mobile unit, in step 106, makes a telephone connection based on the calling number which inputted by the user. If it is identical to the at least one default dialing number, in step 108, mobile unit retrieves one primary dialing number from the first database based upon a current location of the mobile unit. As mobile unit receives the broadcasting signal of serving base station, it derives a rough location information. This information could be current Mobile Country Code (MMC), a Mobile Network Code (MNC), and a Location Area Code (LAC) from a current Public Line Mobile Network (PLMN). Once the current PLMN values are derived, the present invention searches for a corresponding primary dialing number in the first database based on the MMC, MNC, and LAC, or the like. Then, the present invention makes a first telephone connection, in step 110, based on the primary dialing number obtained in step 108.

The mobile unit further contains a second database for storing a plurality of secondary dialing numbers, each of the secondary dialing numbers corresponding to a service, e.g., ambulance service or police service. When the first telephone connection is made for a predetermined time and then fails, the mobile unit may auto-dial with alternative number or display options to use the secondary dialing number to connect to the emergency services. For example, when the first telephone connection for emergency service fails, the mobile unit may automatically dial an alternative number for asking for emergency service. The alternative number may belong to an emergency department of the local police office. If numbers for local emergency agencies stored in the second database are all unavailable, there is an international number which belongs to the country/city where the user comes from. The mobile unit can use the international emergency number to connect to native emergency agencies.

Another example shows as below; since the emergency calls may be further categorized into fire-related, ambulance-related, and police-related emergency calls in many countries. The mobile unit may provide the users to specify types of emergency he needs, i.e., ambulance, fire, police, or no-preference, for example. Once the user selects the type of emergency, when the mobile unit uses the current MCC, MNC, and LAC it received to search for the second database to derive the secondary dialing number storing in the second database.

After the mobile unit tries to make a first telephone connection based with the primary dialing number in step 110, as shown in FIG. 1(*b*), the mobile unit, in step 112, detects if the first telephone connection is successful or not. If the first telephone connection failed, i.e., busy or not available, the present invention, in step 114, retrieves one secondary dialing number from a second database of the mobile unit. The second database may contain numbers corresponding to the primary dialing numbers. Or the second database contains numbers corresponding to different geographic locations. The mobile unit may uses MMC, MNC, and LAC from the current PLMN to search for a corresponding secondary dialing number in the second database. Then, the present invention, in step 116, makes a second telephone connection based on the secondary dialing number.

In order to satisfy the needs of making a default telephone connection directly at any locations, a database for storing the information is required. The first database and second database of the present invention may further include the functions of load, restore, reset, search, insert, delete and update. Users may load the first database or second database from a text file, restore the database stored in the nonvolatile memory to a working memory, or erase the whole database. Users may further search for the first database or the second database by using MCC, MNC, and LAC. Or users may insert a record into the database, delete a record from the database, or update the record from the database according to the MCC, MNC, and LAC of the mobile unit.

Figure 2A:
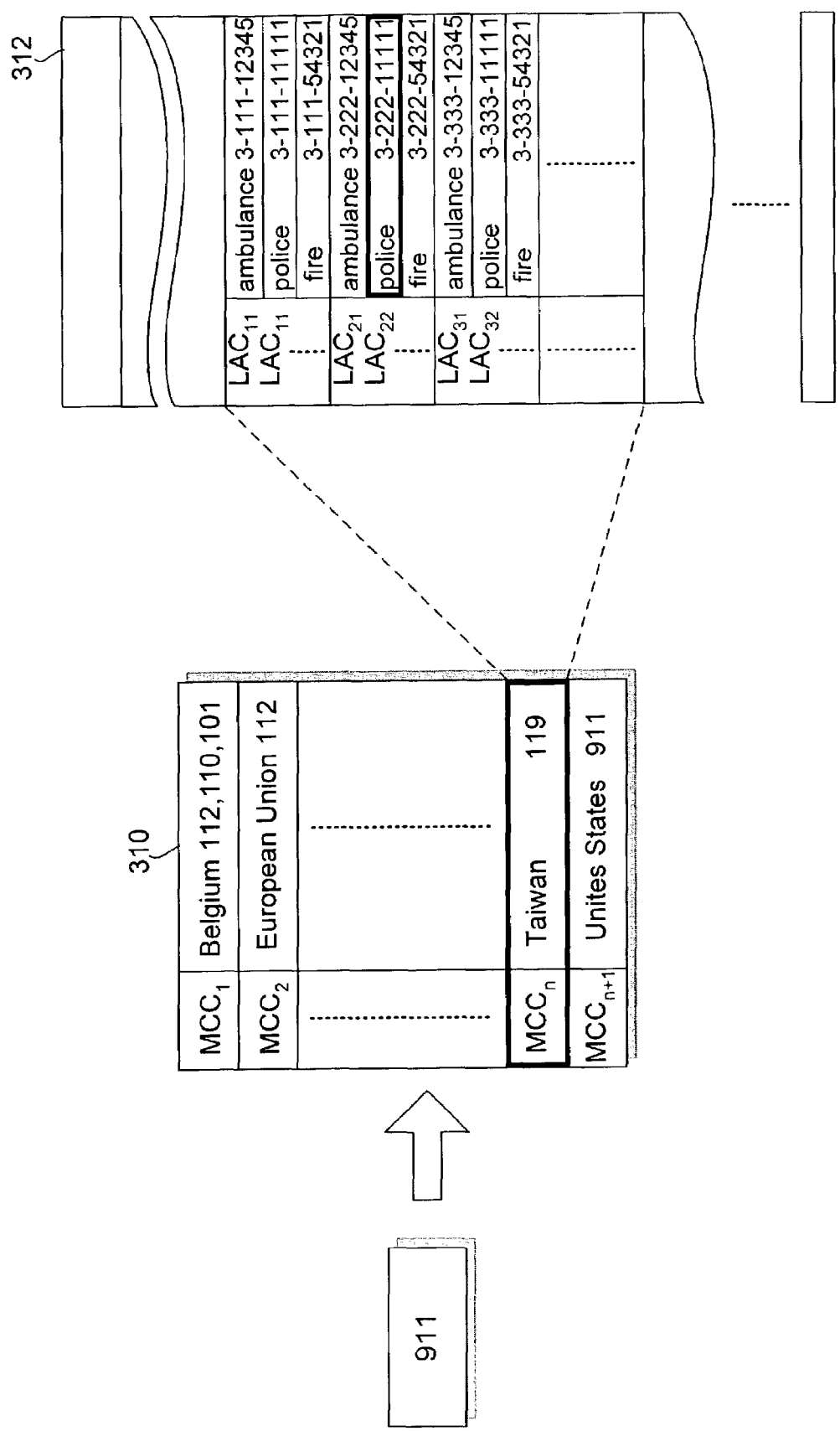
FIG. 2(a) shows one exemplary embodiment of the invention.
Figure 2B:
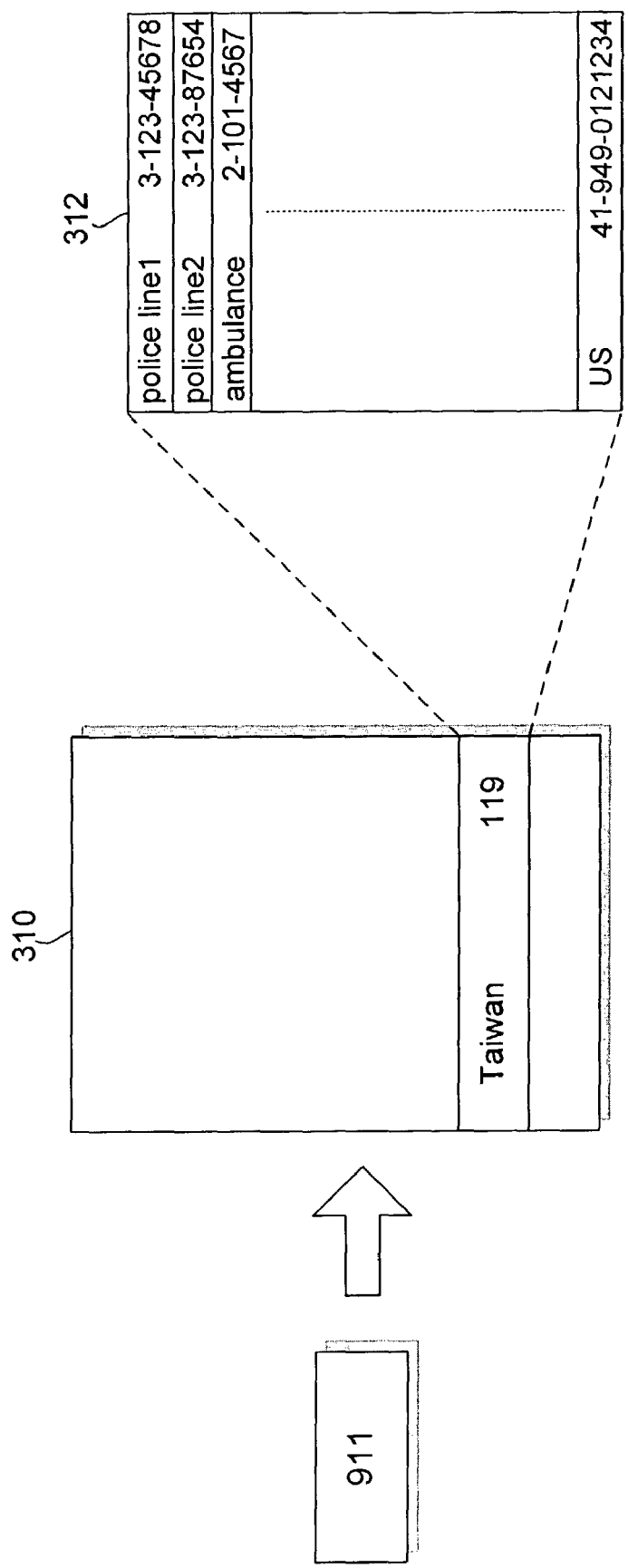
FIG. 2(b) shows another example of the second database.

FIG. 2(*a*) illustrates one embodiment of the invention. A user defines "9-1-1" as the default telephone number for emergency service. When a user, coming from US or Canada and traveling in Taiwan, dials an emergency calling number "9-1-1", by the method recited above, the mobile unit retrieves one corresponding number "1-1-9" from the first database 310 based on the Mobile Country Code (MCC) information of the broadcasting signal which is broadcasted by the serving base station. By mapping the MCC information to a country, in this example, the mobile unit maps the emergency calling number "9-1-1" to the corresponding number "I-1-9" as a calling number to make a telephone connection in Taiwan. If the circuitry connected to the emergency center using the number "1-1-9" is busy, the mobile unit asks the user to specify the type of emergency. When the user selects a police service, the mobile unit will use the Local Area Code (LAC) information of the broadcasting signal which is broadcasted by the serving base station, $LAC_{22}$, to search the second database 312 to derive the dialing number "3-222-11111" for police service. The mobile unit then uses the dialing number "3-222-11111" to make another telephone connection.

Another example of the second database is illustrated in FIG. 2(*b*), the second database contains a couple of pre-defined emergency numbers which correspond to different countries. When a user coming from US or Canada and traveling in Taiwan dials an emergency calling number "9-1-1", by the method recited above, the corresponding number "1-1-9" is also busy or not available. The mobile unit will sequentially use the numbers of the second database shown in FIG. 2(*b*). If numbers for local emergency agencies stored in the second database are all unavailable, there is an international number which belongs to the country/city where the user comes from.

Figure 3:
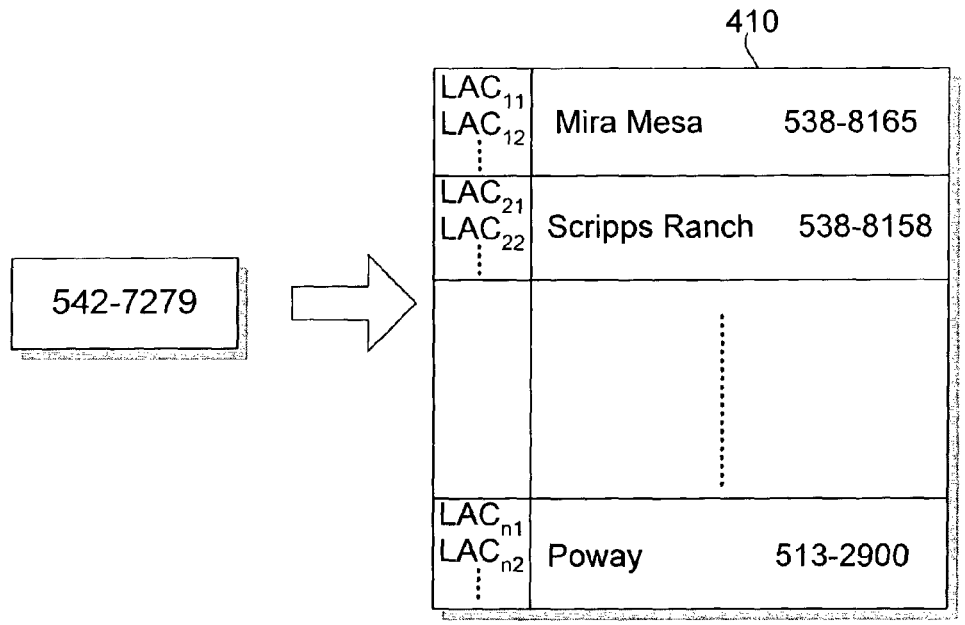
FIG. 3 shows the second exemplary embodiment of the invention.
Figure 4:
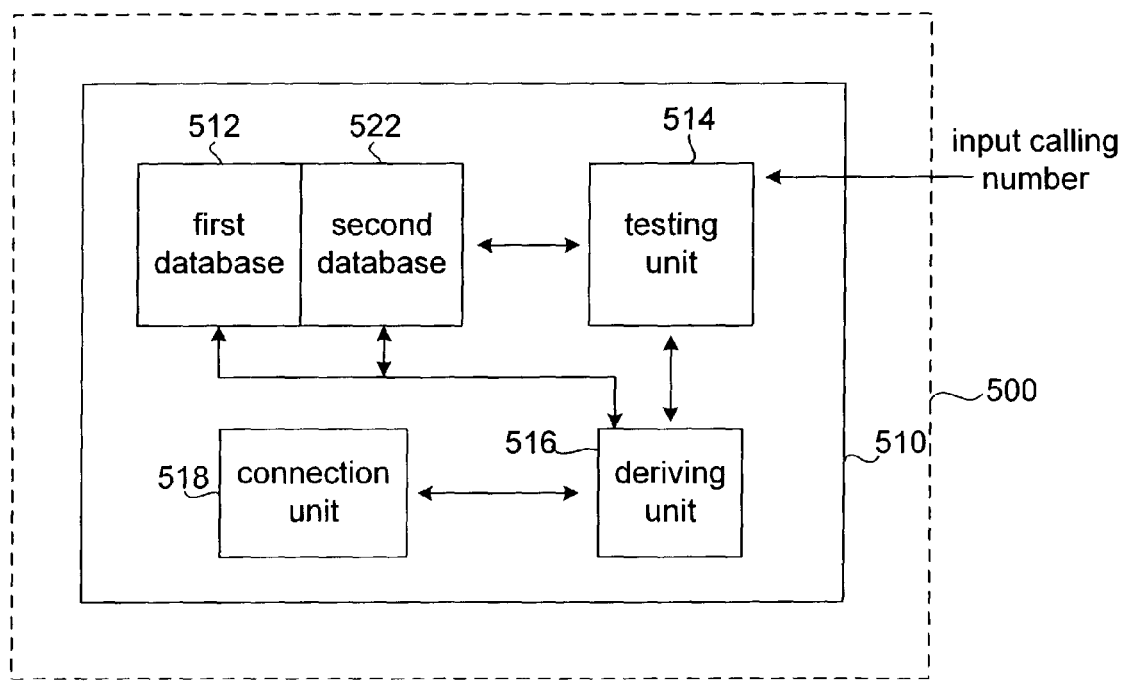
FIG. 4 shows a calling apparatus for a mobile unit of the present invention.

FIG. 3 shows another exemplary embodiment of the invention. A user defines "542-7279" as the default telephone number for library service. When the user stays in Poway and dials a calling number "542-7279", the mobile unit retrieves one corresponding number "513-2900" from the first database 410 based on the LAC information obtained from the PLMN in Poway. The mobile unit uses the corresponding number "513-2900" as a calling number to make a telephone connection for library service.

The present invention also provides a calling apparatus 510 for use within a mobile unit 500. The mobile unit 500 pre-stores at least a default dialing number. The mobile unit 500 has a first database 512, a test unit 514, a deriving unit 516 and a connection unit 518. The first database 512 stores a plurality of primary dialing numbers. Each of the primary dialing numbers corresponds to one default dialing number and to one geographic location. The test unit 514 tests if an input calling number dialed by a user is identical to the default dialing number. The deriving unit 516 derives one primary dialing number from the database based upon a current location of the mobile unit 500. The connection unit 518 makes a telephone connection based upon the primary dialing number obtained from the deriving unit 516. The present invention further has a second database 522 for storing a plurality of secondary dialing numbers, each of secondary dialing numbers corresponding to a service. The connection unit 518 further derives one secondary telephone number from the second database 522 based upon a service user selects if making a telephone connection is not successful, and makes another telephone connection based upon the secondary telephone.

While this invention has been described with reference to illustrative embodiments, these embodiments are not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as falling within the true scope of the invention.

The invention claimed is:

1. A mobile unit storing a default phone number, the mobile unit comprising:
    a first database for storing a plurality of primary phone numbers, each of the primary phone numbers corresponding to one geography location;
    a second database for storing a plurality of secondary phone numbers;
    a test unit for testing if an input calling number dialed by a user is identical to the default phone number;
    a deriving unit for deriving a selected primary phone number from the first database based upon a current location of the mobile unit if the input calling number is identical to the default phone number; and
    a connection unit for making a first telephone connection based upon said with the selected primary phone number and for selecting and making a second telephone connection with one of the secondary phone numbers according to the current location of the mobile unit when the first telephone connection failed.

2. The mobile unit of claim 1, wherein the default phone number is a number for emergency service.

3. The mobile unit of claim 1 wherein the geography location is a country.

4. The mobile unit of claim 1, wherein the deriving unit further deriving the selected primary phone number based upon a Mobile Country Code (MCC) information received from a current Public Line Mobile Network.

5. The mobile unit of claim 1, wherein each of the plurality of secondary phone numbers corresponding to Local Area Code (LAC), the mobile unit based upon a Local Area Code (LAC) information received by the mobile unit from a current Public Line Mobile Network, retrieving the selected second secondary phone number from the second database.

6. The mobile unit of claim 1, wherein each of the plurality of secondary phone numbers corresponding to Mobile Country Code (MCC), the mobile unit retrieving the selected second secondary phone number from the second database.

7. The mobile unit of claim 6, wherein the second database further comprising a native number, when mobile unit cannot find any available secondary phone number, the mobile unit retrieving the native number from the second database and making an international call by using the native number.

8. The mobile unit of claim 1, further comprising a display for displaying a plurality of options when the first telephone connection failed, each option corresponding to at least one of the secondary phone numbers based upon the current location of the mobile unit.

* * * * *